UNITED STATES PATENT OFFICE 2,318,387

HEXYL-CHLORO-m-CRESOL ANTISEPTIC

Frank W. Hartman and Victor Schelling, Detroit, Mich., assignors to Henry Ford Hospital, Detroit, Mich., a corporation of Michigan No Drawing. Application November 16, 1939, Serial No. 304,706

4 Claims. (Cl. 167—31)

This invention relates to a new hydroxy-chloro-alkyl-benzene compound known as 4-hexyl 6-chloro-meta-cresol, having remarkable antiseptic properties developed conjointly with our discovery of hexyl-dichloro-resorcinol described in a separate specification and application for Letters Patent of the United States, Serial No. 304,734, filed November 16, 1939.

Like resorcinol, cresol has long been recognized for its disinfectant properties, and since both these substances are of the phenol series, the experimental development resulting in the present invention was somewhat similar to that of hexyl-dichloro-resorcinol in that it was desired to synthesise a compound combining cresol with the alkyl and halogen groups because of their known beneficial effect upon the antiseptic power of phenolic compounds.

In the preparation of 4-hexyl-6-chloro-m-cresol, 6-chloro-m-cresol, (2-chloro-5-hydroxy toluene Eastman) is used as the initial material. If the former substance is used 47 grams are placed in a flask fitted with a calcium chloride tube and 46 grams of caproyl chloride, $$CH_3 \cdot CH_2 \cdot CH_2 \cdot CH_2 \cdot CH_2 \cdot COCl$$

are added, the mixture being slowly heated until HCl gas begins to evolve. At this point the temperature is kept fairly constant until the reaction begins to be slower, when the temperature is gradually raised and kept near the boiling point for half an hour. If the commercial chloro-m-cresol is used, the interaction is between 1 mol. of this compound and 1 mol. of the caproylchloride. The resulting product is 6-chloro-m-cresol caproylester as shown by the following chart:

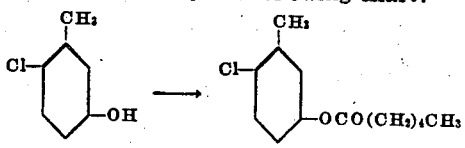

It is distilled under reduced pressure and is a clear, heavy liquid which has a boiling point between 184°–187° C. at 20 mm. Hg.

As the next step, the ester is mixed with 1.2 mols of anhydrous aluminum chloride, and because of the violent exothermic reaction which takes place, it must first be cooled. It is then slowly heated in an oil bath to 80° C. and kept at this temperature for half an hour; then the temperature is raised to 140° C. and kept there until no more HCl gas is formed. When the mixture has cooled down to about 80° C. hot water and concentrated hydrochloric acid are added. The solid mass dissolves upon heating, leaving the ketone at the bottom.

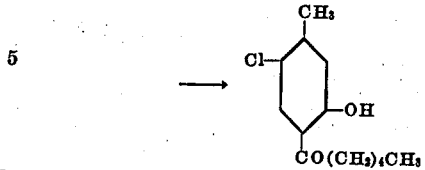

After washing with boiling water, the ketone is dissolved in 3 parts of 95% alcohol, and this solution is added to 6 volumes of HCl which has been heated in a three-neck flask fitted with a stirrer and a condenser.

Amalgamated zinc metal is added and the heating and stirring is continued until the ferric chloride reaction for ketone is negative.

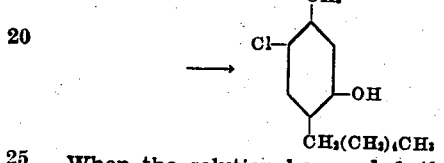

When the solution has cooled, the 6-chloro-4 hexyl-m-cresol is extracted with ether, the extract being washed with a weak sodium carbonate solution, dried with anhydrous sodium sulphate, and then distilled in high vacuum (below 1 mm. Hg) collecting the fraction which boils between 145°–150° C. It is a clear liquid which crystallizes into a white mass in the cold.

6-chloro-4-hexyl-m-cresol is ideal as an antiseptic because it combines great strength with low toxicity and also retains remarkable killing power when greatly diluted. As with hexyl-dichloro-resorcinol, the effectiveness of the compound as an antiseptic is increased by the addition of small amounts of acid, sufficient to bring the pH down to 2 or 3. The following table gives the results of bactericidal tests upon this substance by the F. D. A. method—Shippen modification, and the Salle & Lazarus method, with toxicity indices, first using 6-chloro-4-hexyl-m-cresol alone, and second showing the results obtained with addition of 0.36% hydrochloric acid:

| Highest dil. kills in 10 min. but not in 5 min. | | Tissue culture | Toxicity Index | |
|---|---|---|---|---|
| A | B | C | C/A | C/B |
| S. aureus 130000 plus .36 HCl 200000 | E. typhi 1000 5000 | 8000 10000 | .06 .045 | 8. 2. |

Other acids, both organic and inorganic, will give a comparable increase in the effectiveness of the substance, although some of these acids, notably tannic and hydrochloric, have a better effect than others. A pH value of 2 or 3 is recommended because at this point there is a marked increase in the bactericidal properties with not only no increase but, in fact, a decrease of the tissue toxicity, which obviously should be kept as low as possible. However, generally speaking, higher concentrations of acid will further increase the effectiveness and lower concentrations will decrease the effectiveness, as will buffering the solution, but exhaustive experiments indicate that the addition of acids, as above described, is broadly applicable to all carbocyclic antiseptics.

We claim:

1. An antiseptic composition comprising 4-n-hexyl-6-chloro-m-cresol.
2. An antiseptic composition comprising 4-n-hexyl-6-chloro-m-cresol and an amount of acid such as to provide a pH value between 2 and 3.
3. An antiseptic composition comprising 4-n-hexyl-6-chloro-m-cresol and an amount of hydrochloric acid such as to provide a pH value between 2 and 3.
4. An antiseptic composition comprising 4-n-hexyl-6-chloro-m-cresol and an amount of tannic acid such as to provide a pH value between 2 and 3.

FRANK W. HARTMAN.
VICTOR SCHELLING.